United States Patent
Nishimura et al.

(10) Patent No.: US 6,790,535 B2
(45) Date of Patent: Sep. 14, 2004

(54) REEL HAVING PROTECTIVE COATING

(75) Inventors: Yasushi Nishimura, Izumi (JP); Yasunori Hosoya, Osaka (JP); Tomoharu Sakurai, Wakayama (JP); Chiyo Nishiku, Higashimurayama (JP)

(73) Assignee: Shimano, Inc., Osaka (JP)

( * ) Notice: Subject to any disclaimer, the term of this patent is extended or adjusted under 35 U.S.C. 154(b) by 15 days.

(21) Appl. No.: 10/158,109

(22) Filed: May 31, 2002

(65) Prior Publication Data

US 2002/0150774 A1 Oct. 17, 2002

Related U.S. Application Data

(62) Division of application No. 09/588,197, filed on Jun. 6, 2000, now abandoned.

(30) Foreign Application Priority Data

Jun. 8, 1999 (JP) ............................................. 11-161142

(51) Int. Cl.[7] ......................... B32B 15/04; B32B 15/08; B32B 27/06; B32B 27/30; A01K 89/15
(52) U.S. Cl. ....................... 428/457; 428/911; 428/912; 242/223; 242/224; 242/322
(58) Field of Search ................................ 428/457, 458, 428/461, 911, 912; 242/223, 224, 322

(56) References Cited

U.S. PATENT DOCUMENTS

| | | | |
|---|---|---|---|
| 4,824,728 A | | 4/1989 | Parsons et al. |
| 5,037,680 A | | 8/1991 | Papendick et al. |
| 5,064,695 A | | 11/1991 | Kido et al. |
| 5,104,742 A | * | 4/1992 | Hayner et al. ............... 428/461 |
| 5,387,634 A | | 2/1995 | Lichtenstein et al. |
| 5,389,219 A | | 2/1995 | Zwack et al. |
| 5,577,338 A | | 11/1996 | Matsumoto et al. |
| 5,693,710 A | | 12/1997 | Srinivasan et al. |
| 5,773,154 A | * | 6/1998 | Takada ........................ 428/458 |
| 5,798,409 A | * | 8/1998 | Ho et al. ...................... 524/506 |
| 5,902,759 A | * | 5/1999 | Dismukes et al. ............. 501/80 |
| 5,955,545 A | | 9/1999 | Marutani et al. |
| 6,088,947 A | * | 7/2000 | Suzue et al. .................. 43/18.1 |
| 6,209,816 B1 | * | 4/2001 | Hitomi et al. ................ 242/322 |

FOREIGN PATENT DOCUMENTS

| | | |
|---|---|---|
| EP | 0587099 A | 3/1994 |
| GB | 807912 | 1/1959 |
| WO | WO-0041530 A | 7/2000 |

* cited by examiner

Primary Examiner—Paul Theodeau
Assistant Examiner—Nikolas J. Uhlir
(74) Attorney, Agent, or Firm—Shinjyu Global IP Counselors, LLP

(57) ABSTRACT

Parts inexpensively coated that yet are difficult to mar. The reel body 1 of a double bearing reel is given as an example of a part superficially coated in accordance with the invention. It includes a metallic base portion 10, an oxide film layer 11, a substrate paint film layer 12, and a finishing paint film layer 13. The finishing paint film layer 13 is formed by the application of a self-mending paint material. Forming the paint film layer on the surface of the reel body 1 by applying a self-mending paint material by the self-mending function of the paint material thus restores scratched portions if the surface is damaged due to scratching or the like. Therefore, scratches due to injuries tend not to remain on the coated part and as a result, scratches are unlikely to damage the surface of the body of the part. Moreover, forming the layer by applying a paint material facilitates low cost production.

7 Claims, 9 Drawing Sheets

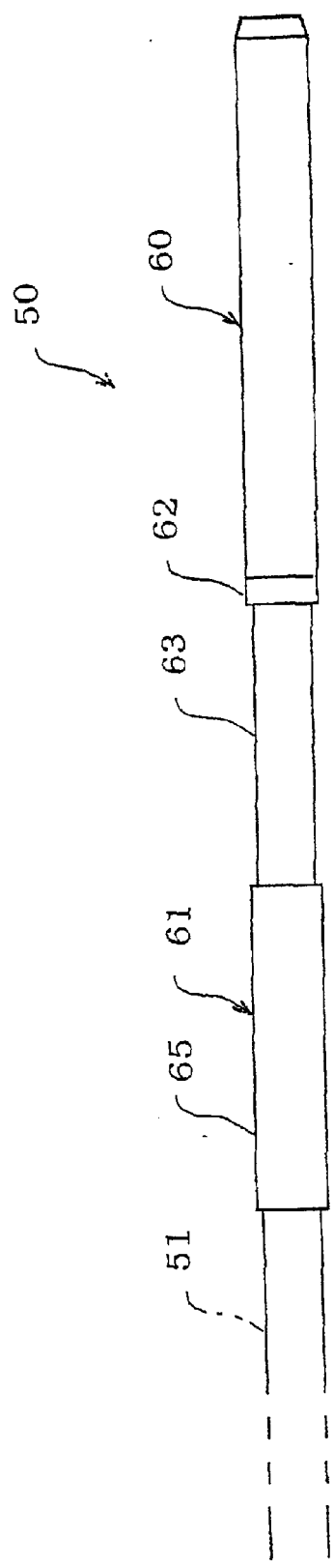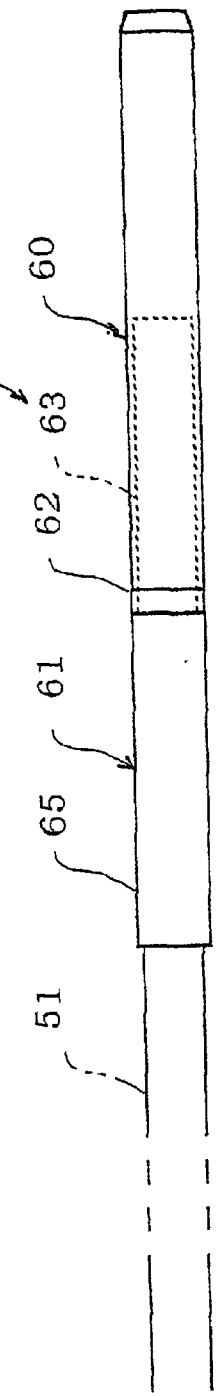

REEL HAVING PROTECTIVE COATING

CROSS-REFERENCE TO RELATED APPLICATIONS

This application is a divisional application of U.S. patent application Ser. No. 09/588,197 filed on Jun. 6, 2000, now abandoned which claims a priority of Japanese Patent Application 11-161142, filed on Jun. 8, 1999. The entire disclosure of U.S. patent application Ser. No. 09/588,197 is hereby incorporated herein by reference.

BACKGROUND OF THE INVENTION

1. Technical Field

The present invention relates to coated parts, and in particular to coated parts that are coated with protective coating and used outdoors in bicycle components and fishing equipment.

2. Description of Related Art

Paint films are often formed from painting materials onto parts that are frequently used outdoors in bicycles and fishing equipment, especially onto parts made of metallic materials. Thus forming films onto the body of metal parts keeps them from being exposed to corrosive atmospheres and improves their anti-corrosiveness. Also, forming paint films with various colored painting materials enhances design characteristics.

Wherein the paint films are formed using ordinary painting materials such as acrylic or urethane resin paints, the paint film hardness will be low compared to the metals. Therefore, sliding motion between like parts, or parts being dropped can damage the paint film superficially on the parts and expose the material surfaces. Foreign substances such as water get in through those portions of the paint film that are injured, which makes the paint film tend to peel away. Furthermore, if the paint film is impaired, the appearance can no longer be maintained. Moreover, with metals that corrode easily, such as magnesium alloy, if the film is damaged the metals tend to corrode.

To make surfaces difficult to mar, instead of paint films it has been the practice to form onto materials hard metallic thin films that are highly anti-corrosive by such methods as plating, ionic implantation, or vapor deposition. The surfaces of parts on which hard metallic thin films are formed are not easily injured. Nevertheless, the metal materials at times corrode when brought into direct contact with like metals and, due to differences in ionization tendency, an internal battery is set up. This makes complex procedures necessary such as interposing an insulating layer between the part surfaces and the hard metallic layer, which raises manufacturing costs.

SUMMARY OF THE INVENTION

An object of the present invention is inexpensively to provide coated parts that are not easily marred.

Another object of the present invention is inexpensively to provide coated parts that are not easily corroded.

The coated part according to the invention is a first aspect including a part body superficially onto which a paint film layer is coated. Applying a highly restorative paint material to at least part of the surface of the part body forms the paint film layer.

In the paint film layer formed by superficially applying a highly restorative paint material to the body of the coated part, if the coated part is scratched, the scratched portion mends and the paint film on the surface is reformed. Therefore, if a scratch forms on the surface the scratch does not remain, and as a result the coated part is not easily marred. Moreover, forming the layer by applying a paint material facilitates low cost production.

It should be noted that herein "highly restorative paint material" are paint materials such as self-mending paints formed from the special acrylic resin paints manufactured by Natoko Paint Co. Ltd., for example, which usually are offered in the form of a transparent, clear paint. Herein, "self-mending function" is a function wherein abrasions of a certain extent or dents caused by pressure exist temporarily as injuries compared with the rest of the surface, but due to the elasticity of the paint film are restored after awhile, which makes the injuries disappear.

The functional-group side chains (chains between the cross-linking points and the acrylic main chains) in the self-mending paints are long compared to general acrylic resin paints. The significance of this is that not only the side chains, but also the cross-linking portions between the acrylic main chains in self-mending paints constitute a structure in which the degree of kinetic freedom is very high. Consequently, the long side chains work as springs against external pressure, realizing the self-mending function by elasticity. Also, compared to general paint films, the lubricity of the paint film surface of self-mending paints is high—the coefficients of friction of the surface are low. Therefore, something hard striking the paint film will tend to slip, and force due to external pressure is widely dispersed in directions parallel to the paint film, attenuating force in the perpendicular direction. Accordingly, even the paint film itself cannot easily be damaged.

The coated part in a second aspect is in accordance with the first aspect of the invention, but wherein at least a portion of the part body is exteriorly exposed. Herein, if the coating layer formed on the exteriorly exposed portion that frequently makes contact external parts is scratched, the scratched portion is restored and the scratch tends to disappear. As a result, the exposed portion tends not to be scratched.

In a third aspect the coated part is as set forth in the foregoing aspects, but further wherein the part body includes a sliding portion for sliding against another part. Herein, if the coating layer on the surface is damaged when the sliding portion slides against the other part, its sliding state tends not to fluctuate since the coating layer reforms. For this reason, if the coating layer is formed on, for example, sliding portions making up male-female engagement parts that slide in components equipment, their engagement state will not tend to tighten nor loosen.

In a fourth aspect of the present invention the coated part is as set forth in the foregoing aspects, but further wherein the coating layer is translucent, and a substrate paint film layer, formed by applying a colored paint, is present between the part body and the coating layer. Herein, since the coating layer is translucent, designs or letters on the substrate paint film layer formed by applying a colored paint may be seen through the coating layer. Protecting the substrate paint film layer with a coating layer that is not easily marred also maintains the appearance of the substrate paint film layer.

In a fifth aspect the coated part is as set forth in the foregoing aspects, but further wherein the part body is used for fishing equipment. In this case, the coating layer on fishing equipment often used outdoors in a corrosive atmosphere is unlikely to be damaged, maintaining the appearance of the fishing equipment. This also keeps the part body from being exposed directly to corrosive atmospheres, and hence the part body is unlikely to become corroded.

The coated part of the invention in a sixth aspect is as set forth in the foregoing aspects, but further wherein the part body is used in bicycles. Herein, the coating layer on bicycle parts that are frequently used outdoors is not likely to become damaged, which helps to maintain the appearance of the bicycles. This also keeps the parts from being exposed directly to the open air, and hence, the parts are unlikely to become corroded.

In a seventh aspect the coated part is as set forth in the foregoing aspects, but further wherein the part body is made of metal. In this case, if a coated part having a metallic part body is used in a corrosive atmosphere, it is not likely to corrode since the part body is covered by a coating layer that is not easily damaged.

The coated part of the invention in an eighth aspect is in accordance with the seventh aspect, but further wherein the part body is made of an aluminum alloy or a magnesium alloy, and an anodic oxidized film layer is present between the body of the part and the coating layer. Herein, since the part body made of an aluminum or magnesium alloy, which tend to corrode, is covered by the coating layer via the anodic oxidized film layer, the adherence of the coating layer as well as the anti-corrosion properties of the part are increased.

In a ninth aspect the coated part is as set forth in the foregoing aspects, but further wherein the part body is made of a synthetic resin. In this case, since the part body is made of a synthetic resin, which is not as hard as metal and thus fragile, is covered by the coating layer formed by a self-mending paint material, the synthetic resin body of the part is not likely to be damaged.

The coated part of the invention in a tenth aspect is in accordance with the ninth aspect, but further wherein the body of the part is a fiber-reinforced synthetic resin laminate article wherein a synthetic resin base material is impregnated into a high-strength fiber backing. Herein, even in fiber-reinforced synthetic resin laminate articles in which water tends to cause peeling, because the coating layer is not likely to become damaged and hence water is not likely to get into the body of the part, peeling is unlikely.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIGS. 7A and 7B are lateral views respectively depicting extended and collapsed states of the base portion of a fishing rod to which a third embodiment is adopted;

DETAILED DESCRIPTION OF THE PREFERRED EMBODIMENTS

Embodiment 1

Figure 1:
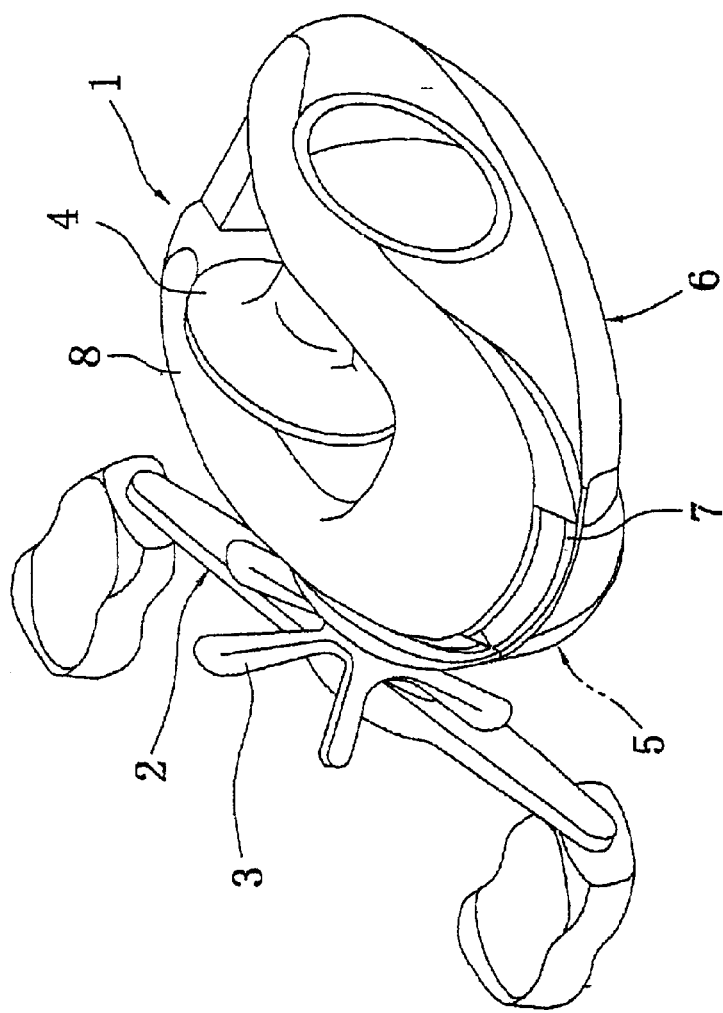
FIG. 1 is an oblique view of a dual-bearing reel to which an embodiment of the present invention is adopted.
Figure 2:
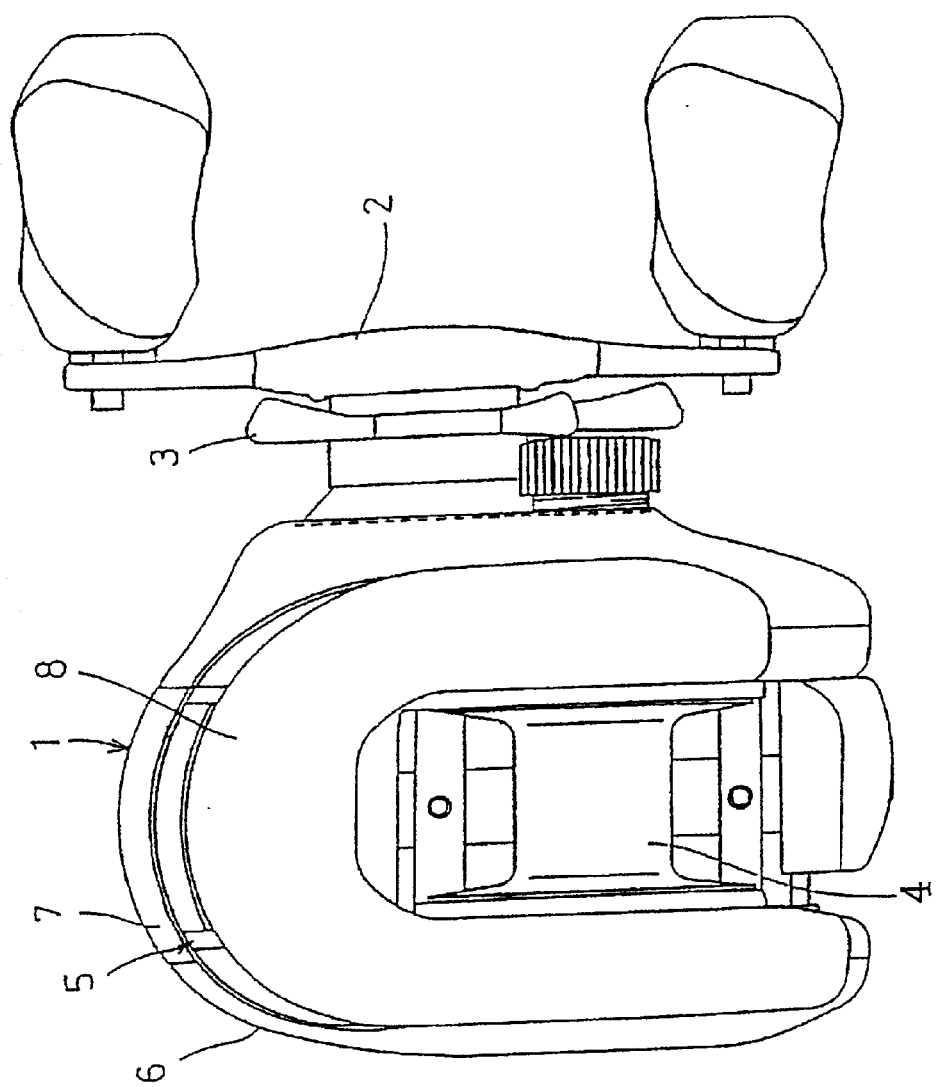
FIG. 2 is sectional plan view of the dual-bearing reel of FIG. 1.

A double bearing reel shown in FIGS. 1 and 2, to which an embodiment of the present invention is applied, is a low-profile type reel for bait cast. The double bearing reel includes a reel body 1 made of a magnesium alloy, a handle assembly 2, and a spool 4 for winding a fishing line. The handle assembly 2 is provided for rotating the spool 4 and is disposed at one side of the reel body 1. The spool 4 is rotatably provided in the reel body 1 and may be detached therefrom. A star drag 3 for adjusting a drag is disposed at the reel body 1 side of the handle assembly 2.

The reel body 1 includes a reel frame 5, a side cover 6 disposed at both side of the frame 5, a front cover 7 covering the front portion of the frame 5, and a thumb rest 8 covering the top. Each member constituting the reel body 1 is made of a magnesium alloy and a coating treatment using a self-mending paint material has been applied on the surface of each member.

Next, the structure of each member that constitutes the reel body 1 will be described in detail.

Figure 3:
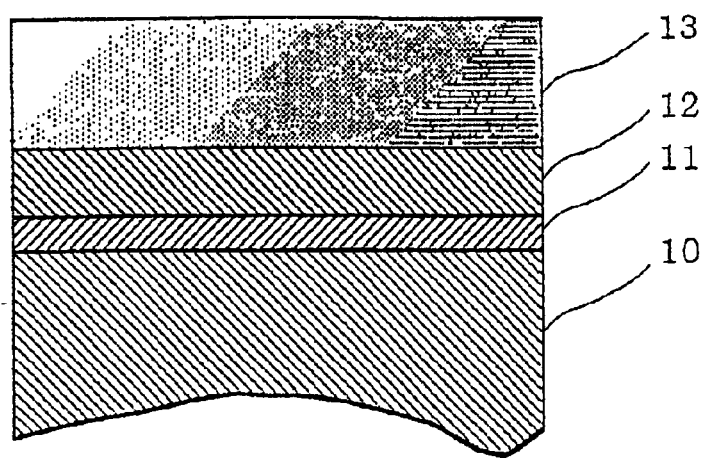
FIG. 3 is an enlarged fragmentary schematic view in section through a general part body in fishing equipment or bicycle components.

As shown in FIG. 3, an oxide film layer 11 is formed by anodic oxidation on the surface of a base portion 10 of each of the members, which are made of a magnesium alloy. The oxide-film layer 11 increases adhesion of the paint material. A substrate paint film layer 12 is formed on the oxide film layer 11, which may improve the design of the surface by adding a color. The substrate paint film layer 12 may be formed by applying a coloring paint such as, for instance, a double-fluid urethane coloring paint, a silicon acrylic coloring paint, an acrylic baked coloring paint, powdered coloring paint (polyester type, hybrid type), and melamine baked coloring paint.

A finishing coating layer 13 is formed on the substrate paint film layer 12 by applying a self-mending paint material having a high recoverability. As a self-mending paint material, for example, a transparent clear paint material made of a special acrylic resin manufactured by Natoko Paint Co. Ltd. 2 may be suitably used. Herein, "self-mending function" is a function wherein abrasions of a certain extent or dents caused by pressure exist temporarily as injuries compared with the rest of the surface, but due to the elasticity of the paint film are restored after awhile, which makes the injuries disappear. The functional-group side chains (chains between the cross-linking points and the acrylic main chains) in the self-mending paints are long compared to general acrylic resin paints. The significance of this is that not only the side chains, but also the cross-linking portions between the acrylic main chains in self-mending paints constitute a structure in which the degree of kinetic freedom is very high. Consequently, the long side chains work as springs against external pressure, realizing the self-mending function by elasticity.

Figure 4:
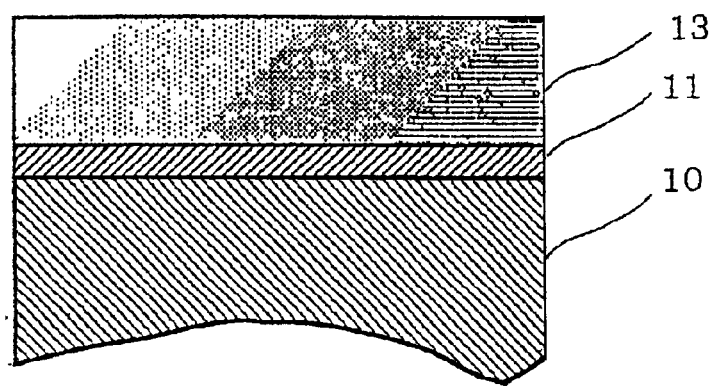
FIG. 4 is an enlarged fragmentary schematic view in section through another general part body in fishing equipment or bicycle components.

The handle assembly 2, the star drag 3, and the spool 4 are also made of a magnesium alloy. As shown in FIG. 4, a finishing coating layer 13 made of the self-mending paint material is directly formed on an oxide film layer 11 by the anodic oxidation method. In this manner, the feel of a metal directly appears on the surface.

Figure 5A:
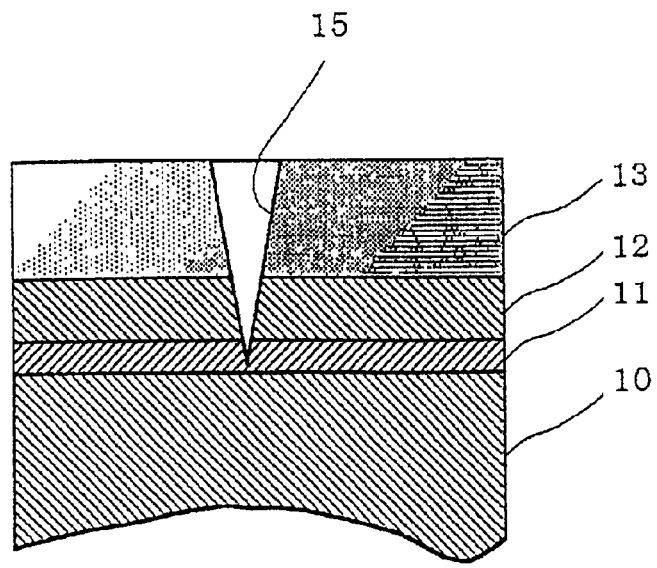
FIGS. 5A and 5B are views corresponding to FIG. 3, depicting progress of mending in a self-mending paint.
Figure 5B:
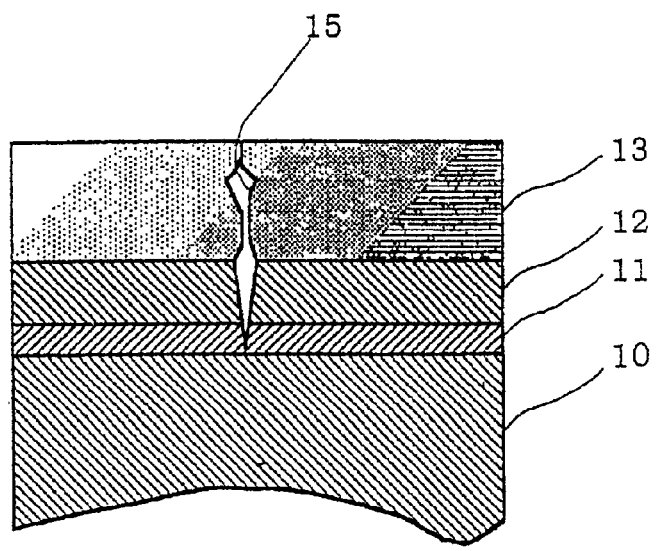

By covering exposed portions of a double bearing reel using the finishing coating layer 13 formed by applying the self-mending paint material in the above-mentioned manner, it becomes possible to mend a scratch 15 shown in FIG. 5A, which is caused by dropping the double bearing reel or rubbing it against a hard material, by the self-recovering property derived from the elasticity of the finishing coating layer 13 to a state shown in FIG. 5B in which the paint material on the surface is restored. Accordingly, the trace of a scratch does not remain on the surface and, as a result, the surface tends not be damaged and the appearance of the surface can be maintained. Also, if the scratch 15 is formed, it will be repaired and the surface of a metal is prevented from being exposed to a corrosive atmosphere often present in such places as a fishing place. Accordingly, metallic parts tend not to be eroded. Moreover, since the layer is formed by applying a paint material, it is easy to form with a moderate price.

Embodiment 2

Although a double bearing reel is used as an example of fishing equipment in the above-mentioned embodiment 1, the present invention may also be applied to a spinning reel.

Figure 6:
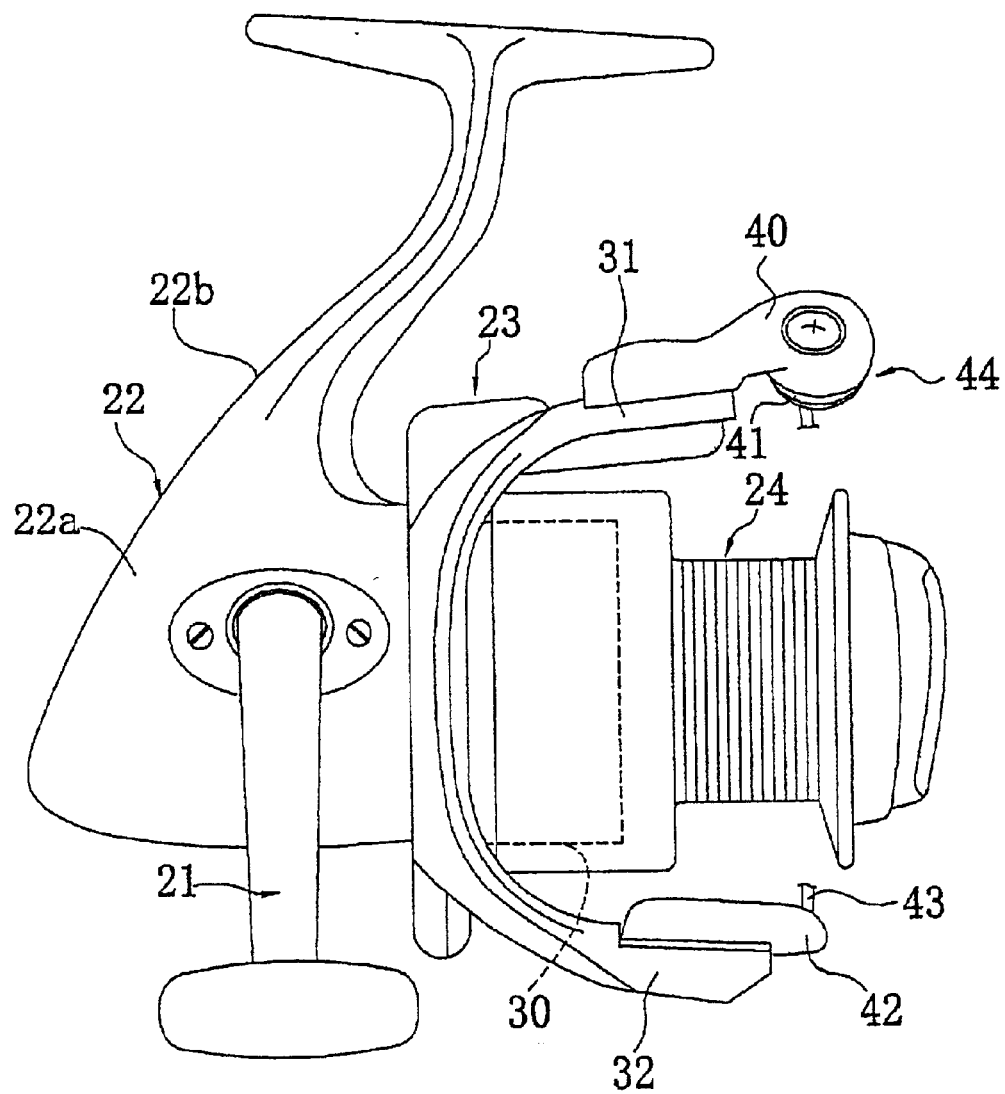
FIG. 6 is side view of a spinning reel to which a second embodiment is adopted.

As shown in FIG. 6, a spinning reel to which the embodiment 2 of the present invention is applied includes a reel main body 22, a rotor 23, and a spool 24. The reel main body 22 rotatably supports a handle 21. The rotor 23 is rotatably supported by the reel main body 22 and is disposed at the front portion thereof. The spool 24 is placed at the front of the rotor 23 in a movable manner in the back and front direction and fishing line is reeled-in around the spool 24.

The reel main body 22 includes a reel 22a for supporting the rotor 23 and the spool 24, and a substantially T-shaped fishing rod mount 22b extending in the upward direction from the reel body 22a. The reel main body 22 may be a member made of, for instance, an aluminum alloy. Mechanisms such as a rotor driving mechanism for rotating the rotor 23 and an oscillating mechanism for uniformly winding the fishing line around the spool 24 by moving the spool 24 in the back and forth direction are provided in the reel body 22a.

As shown in FIG. 3, an oxide film layer 11, a substrate paint film layer 12, and a finishing coating layer 13 are formed on a base portion 10 of the reel main body 22 made of an aluminum alloy in that order. By adopting this configuration, the reel main body 22 is hardly damaged.

The rotor 23 includes a cylindrical portion 30 and a first rotor arm 31 and a second rotor arm 32, each of which is disposed at a respective side of the cylindrical portion 30 so as to be opposed to each other. The cylindrical portion 30 and the rotor arms 31 and 32 are integrally formed member made of, for instance, an aluminum alloy.

A first bail-supporting member 40 is movably attached to the inner periphery side of the end of the first rotor arm 31. A line roller 41 for guiding a fishing line to the spool 24 is attached to the end of the first bail supporting member 40. Also, a second bail supporting member 42 is movably attached to the inner periphery side of the end of the second rotor arm 32. A bail 43 is provided between the line roller 41 located at the end of the first bail supporting member 42 and the second bail supporting member 42. A bail arm 44 for guiding the fishing line to the spool 24 is constituted by the bail supporting members 40 and 42, the line roller 41, and the bail 43. Since the rotor 23 is easily damaged when the fishing rod is placed on, and makes contact with, a rock or a hard ground such as a quay, an oxide film layer 11 and a finishing coating layer 13 are formed on a base portion 10 made of an aluminum alloy in that order as shown in FIG. 4. By adopting such structure, a scratch tends not to be formed on the rotor 23.

Embodiment 3

Although fishing reels are used as examples of fishing equipment in the above-mentioned two embodiments, the present invention may also be applied to a fishing rod shown in FIG. 7.

This fishing rod includes a base rod 50 and at least one rod member 51 which is connected to the base rod 50 in a telescopic manner or in a separate segment manner, and it is possible to change the length of the base rod 50. The base rod 50 and the rod member 51 are made of, for instance, a cylindrically tapered resin laminating mold member which is obtained by winding a prepreg made of a reinforced fiber resin whose carbon fiber has been immersed in epoxy resin, around a tapered rod shape mandrel.

The base rod 50 includes a rod base portion 60 used for operating the fishing rod or attaching a reel, and a movable rod end portion 61 which may be inserted in the rod base portion 60. The movable rod end portion 61 is attached to the rod base portion 60 to be turnable circumferentially. The required rod members 51 are connected to a front end of the rod base portion 60.

A guide tube 62 is disposed at the front end of the rod base portion 60. The movable rod end portion 61 includes a center-axial tube 63 and a protruded pipe 65 which is fitted and fixed to the outer periphery of the end of the center-axial tube 63. The center-axial tube 63 of the movable rod end portion 61 is movably inserted in the cylindrical rod base portion 60 between an extended state as shown in FIG. 7A and a shortened state as shown in FIG. 7B.

Figure 8:
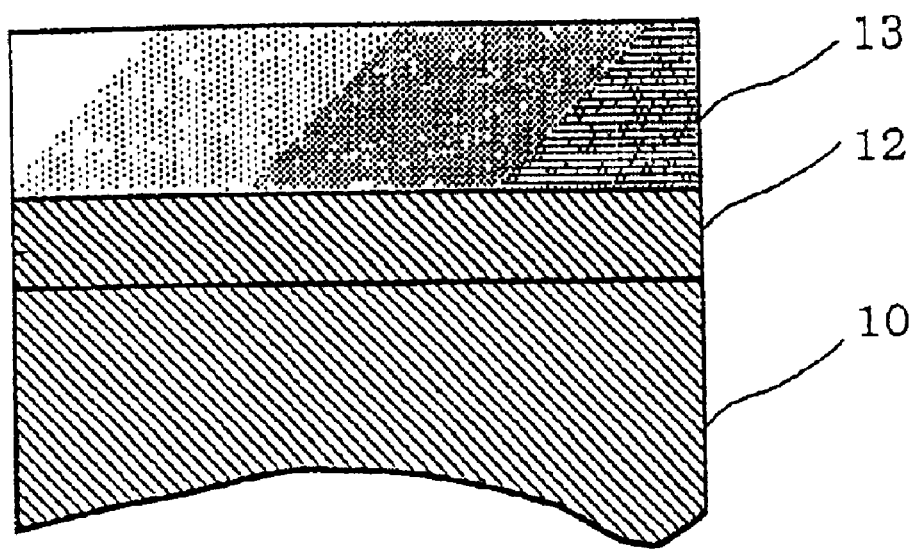
FIG. 8 is an enlarged fragmentary schematic view in section through the center-axial tube of the rod depicted in FIGS. 7A and 7B.

Since the center-axial tube 63 of the movable rod end portion 61 is inserted in the rod base portion 60, it slides against the inner surface of the rod base portion 60. Hence, scratches easily mar its appearance. Accordingly, as shown in FIG. 8, a substrate paint film layer 12 and a finishing coating layer 13 are formed, in that order, on a base portion 10 of the center-axial tube 63 made of carbon fiber reinforced resin. Note that it is possible to form these layers 12 and 13 on the entire surface of the fishing rod including the center-axial tube 63. According to the embodiment 3, a scratch is not easily formed on the center-axial tube 63 when the center-axial tube 63 is moved in and out of the rod base portion 60 and, hence, the beauty thereof may be maintained. Also, if a scratch is formed on the center-axial tube 63, its sliding state is not easily changed since the finishing coating layer 13 is reproduced. For this reason, the engagement state thereof with the base portion 60 tends not be tighten nor loosen. Moreover, since it becomes difficult for foreign substances such as water to invade the resin portion, the laminated layer tends not to be peeled off.

Embodiment 4

Figure 9:
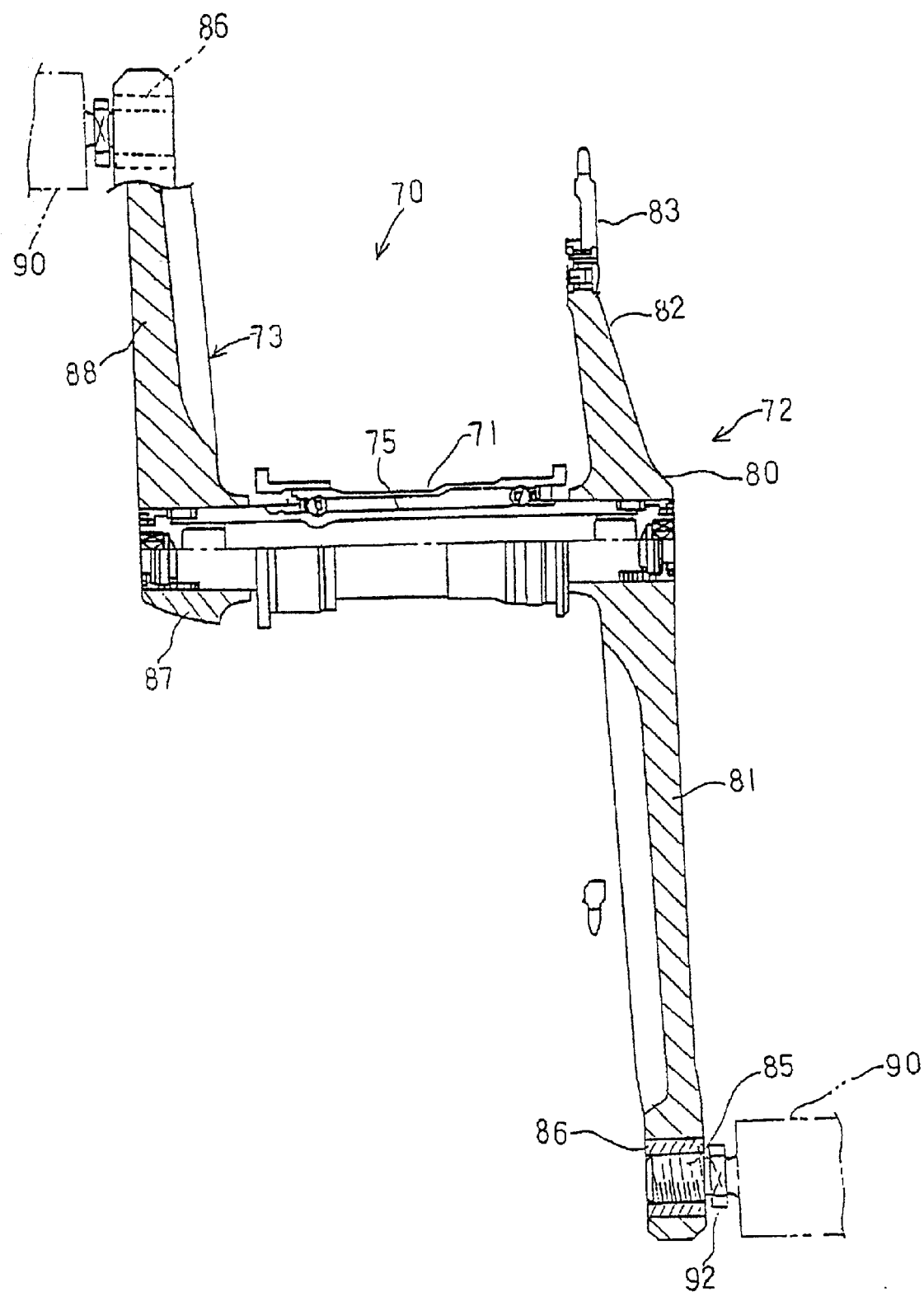
FIG. 9 is cross-sectional view through a crank assembly or a bicycle according to a fourth embodiment.

A crank assembly 70 for a bicycle shown in FIG. 9 includes a right crank arm 72 and a left crank arm 73 which is non-rotatably fixed to the respective end of a crank shaft 75 made of, for instance, an aluminum alloy. The crank shaft 75 is rotatably supported by a bottom bracket 71 which is attached to a bicycle frame (not shown in the figure).

Figure 10:
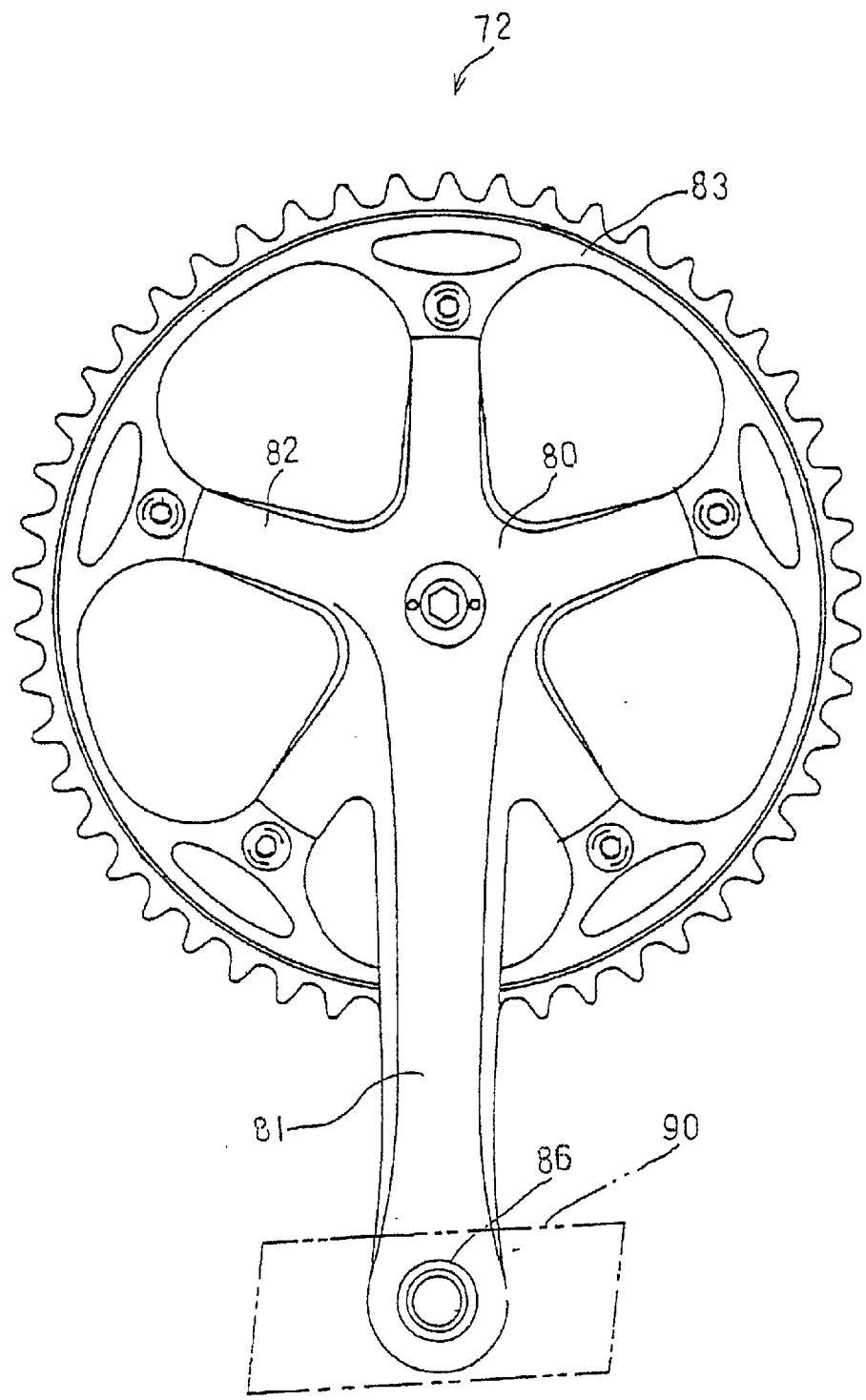
FIG. 10 is a front view of the right crank arm of the FIG. 9 crank assembly.

As shown in FIG. 10, the right crank arm 72 includes a boss portion 80 which is coupled to the crank shaft 75, a crank portion 81 extending outwardly in a radius direction from the boss portion 80, and five coupling fingers 82 extending outwardly in the radius direction from the boss portion 80. The coupling fingers 82 are provided with a substantially equal interval between each other and the crank portion 81 extends in the radius direction from between the two coupling fingers 82. A sprocket 83 is attached to the respective coupling finger 82 in a detachable manner by a bolt.

The right crank arm 72 is made of a magnesium alloy. A pedal shaft 92 made of a stainless alloy for attaching a pedal 90 is disposed at an end of the crank portion 81. For this attachment, a screw hole 85 is formed at the end of the crank portion 81. The screw hole 85 is formed in a sleeve 86 made of an aluminum alloy which is press fitted in the end of the crank portion 81 in a non-rotatable manner.

An adhesive is applied to a space between the sleeve 86 and the end of the crank portion 81. Also, an oxide film layer 11 and a finishing coating layer 13 as shown in FIG. 4 are formed on a base portion 10, made of an magnesium alloy, of the right crank arm 72. For this reason, a scratch is hardly formed on the right crank arm 72.

As shown in FIG. 9, the left crank arm 73 includes a boss portion 87 and a crank portion 88 extending in the radius direction from the boss portion 87. A sleeve 86 made of an aluminum alloy is also press fitted in the end of the crank portion 88, and an oxide film layer 11 and a finishing coating layer 13 as shown in FIG. 4 are formed on a base portion 10 which is made of an magnesium alloy.

In this kind of coated parts for bicycles, also, a scratch is not easily formed on the crank arms 72 and 73 made of a magnesium alloy. Moreover, if the pedal shaft 92 made of a stainless alloy is attached to the crank arms 72 and 73 made of a magnesium alloy, the crank arms 72 and 73 are not easily electrolytically corroded. Further, since the adhesive composition is filled in a space between the sleeve 86 and the crank portions 81 and 88, corrosion is hardly started from the space portion.

Other Embodiments (a) The coated parts according to the present invention are not limited to those for a reel body of a fishing reel, a fishing rod, or a crank arm of a bicycle as disclosed in the previous embodiments, and may be applied to a coated part utilized for a product that is used mainly outside such as fishing equipment or a bicycle. For example, the present invention may be applied to a coated part for a cooler box, a braking device such as a brake lever and a brake arm, and a speed changer such as a front derailleur and a rear derailleur, of a bicycle.

(b) The finishing coating layer is not limited to a clear and transparent one and a colored finishing coating layer may be employed.

(c) Although the metallic coated parts in the above-mentioned embodiments are made of a magnesium alloy or an aluminum alloy the metallic coated parts may be made of other materials such as iron or a copper alloy.

As explained in the foregoing, according to the present invention, since a coating layer is formed on a surface by applying a self-mending paint material having a high self recoverability, if the layer is damaged due to such factors as scratches, the layer is reproduced by the self recovery function. For this reason, if a scratch is formed, the scratch does not remain on the surface and, as a result, a surface is not easily damaged by a scratch. Also, since the layer is formed by applying a paint material, it is readily formed with a low cost.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A reel, comprising:

a reel body made of one of magnesium and aluminum alloys;

a spool provided in front of said reel body;

a handle assembly provided on a side of said reel body;

a transparent coating film layer formed by applying a highly restorative paint material, said transparent coating film layer being provided at least on a part of said reel body;

an anodic oxidized film layer formed between said reel body and said coating film layer; and a substrate paint film layer between said transparent coating film layer and said anodic oxidized film layer, said substrate paint film being formed by applying a coloring paint material.

2. The reel as set forth in claim 1, wherein said spool is rotatably provided in said reel body, and said handle assembly is for rotating said spool.

3. The reel as set forth in claim 2, wherein said reel body includes
    a reel frame,
    a side cover provided at a side of said reel frame,
    a front cover covering a front portion of said reel frame, and
    a thumb rest covering said reel frame, said side cover, and said front cover from above, and said coating film is provided on each of said reel frame, said side cover, said front cover, and said thumb rest.

4. The reel as set forth in claim 1, further comprising a rotor rotatably supported by said reel body and disposed in the front of said reel body between said reel body and said spool, said spool being placed at a front of said rotor so as to be movable in back and front directions.

5. The reel as set forth in claim 4, wherein said transparent coating film layer is further provided on at least a portion of said rotor.

6. The reel as set forth in claim 1, wherein said reel body is made of magnesium alloy.

7. A reel, comprising:

a reel body made of one of magnesium and aluminum alloys;

a spool provided in front of said reel body;

a handle assembly provided on a side of said reel body;

a transparent coating film layer formed by applying a highly restorative paint material, said transparent coating film layer being provided at least on a part of said reel body, said highly restorative paint material being an acrylic resin paint;

an anodic oxidized film layer formed between said reel body and said coating, film layer; a substrate paint film layer between said transparent coating film layer and said anodic oxidized film layer, said substrate film being formed by applying a coloring paint material.

* * * * *